United States Patent [19]
Schmid

[11] 3,856,979
[45] Dec. 24, 1974

[54] SEMICONDUCTING COATING FOR ELECTRICAL GLASS CONDUITS

[75] Inventor: Anthony P. Schmid, Riga, Mich.

[73] Assignee: Owens-Illinois, Inc., Toledo, Ohio

[22] Filed: Nov. 14, 1973

[21] Appl. No.: 415,737

[52] U.S. Cl............ 174/15 C, 106/39.8, 117/124 T, 117/221, 117/229, 174/68 C, 174/110 A, 338/308
[51] Int. Cl............................ H01b 7/34, H01b 9/06
[58] Field of Search............ 174/68 R, 68 C, 110 A, 174/102 SC, 137 R, 137 A, 137 B, 138 R, 138 C, 141 C, 140 C; 338/216, 306, 308, 334; 106/39.8; 117/201, 211, 221, 229, 124 A, 124 B, 124 C, 124 T, 169 A

[56] References Cited
UNITED STATES PATENTS
578,333   3/1897   Hilgeman........................ 174/68 R
3,202,754   8/1965   Ruch................................ 174/68 R Primary Examiner—Arthur T. Grimley
Attorney, Agent, or Firm—Howard G. Bruss, Jr.; E. J. Holler

[57] ABSTRACT

Disclosed is a tubular glass conduit for loosely containing and electrically insulating an electrical power conductor in an underground power transmission network in both alternating and direct current situations. The internal surface of the tubular glass conduit is provided with a semiconductive coating of tin oxide or titanium oxide to provide abrasion resistance, corona discharge protection, as well as inhibiting the tendency for ionic migration from the charged conductor to the glass conduit.

2 Claims, 1 Drawing Figure

PATENTED DEC 24 1974  3,856,979
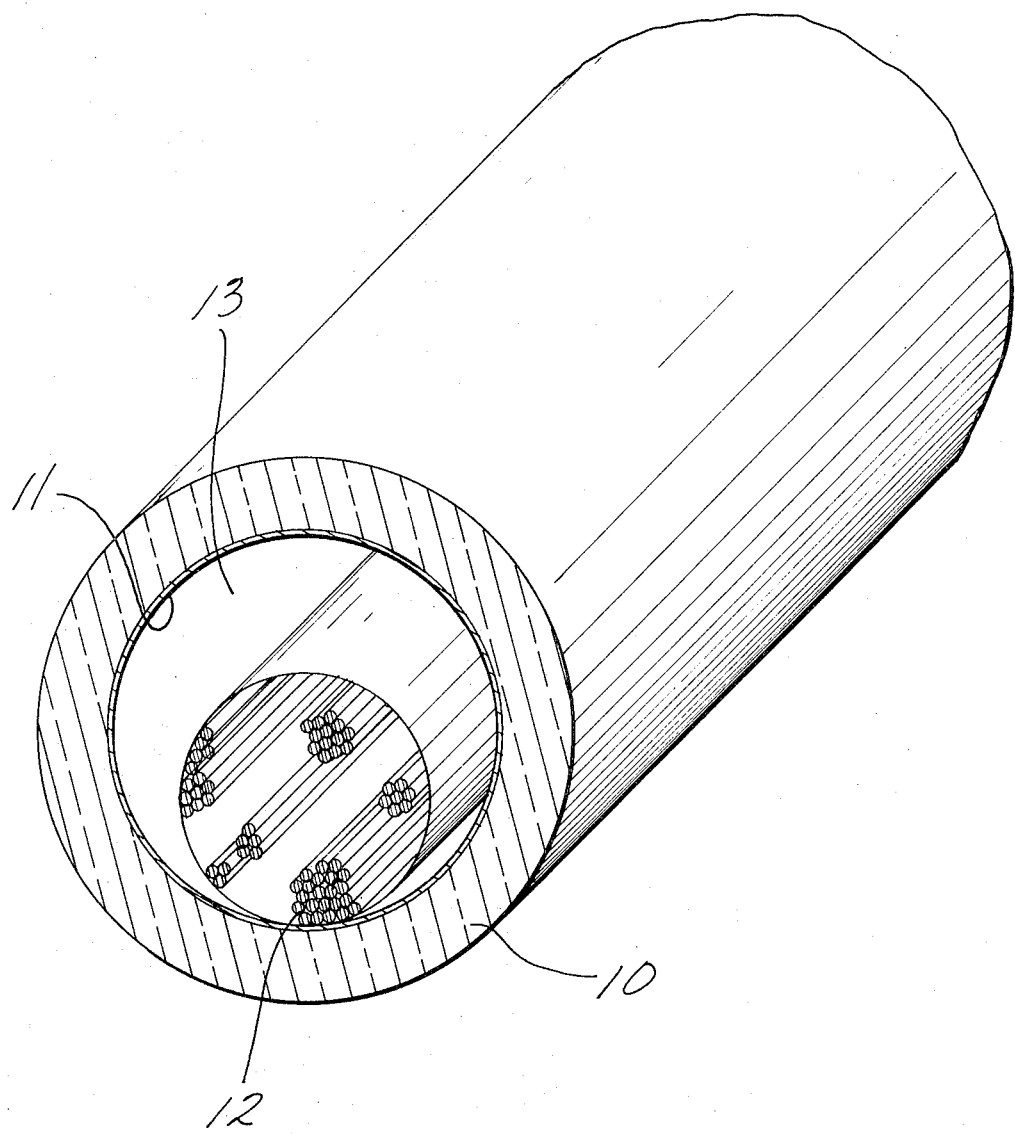

SEMICONDUCTING COATING FOR ELECTRICAL GLASS CONDUITS

This invention concerns a semiconductive coating for the internal surface of a tubular glass conduit for containing electrical power conductors. More particularly, the invention pertains to providing a semiconductive coating of tin oxide or titanium oxide on the internal surface of a tubular glass conduit for containing electrical power conductors capable of transmitting power in excess of 50 megawatts in an undergound power transmission network.

The demand for electrical power has been constantly increasing in recent years and the need for efficient and environmentally acceptable electrical power transmission systems has focused research attention to the development of undergound power transmission systems.

The principal type of the undergound electrical cable presently employed has a paper wrapping which is oil impregnated. This cable is commonly known as the oil-paper cable and one type is shown in U.S. Pat. No. 3,453,373. Another type of insulated cable employs a conductor encased in a layer of semiconductive plastic which in turn is encased in a layer of insulating plastic as in U.S. Pat. Nos. 3,749,817; 3,643,004; 3,580,987; or 3,441,660. In a somewhat related approach, the electrical conductor is carried in an insulating conduit which has a conductive liner on the internal surface thereof so that the electrical conductor and the conductive liner are in direct contact. While this approach provides corona discharge protection, it is burdened with the disadvantage of power loss from the induced current flow in the conductive liner. U.S. Pat. No. 2,273,135 employs a metallic conductive liner on the inside of a glass conduit for containing electrical cable, although conventional airspaced insulation (rather than direct contact between liner and conductor) is employed.

In commonly assigned copending applications Ser. No. 415,919 filed 11-14-73 entitled "An Electric Power Transmission Line" and Ser. No. 415,739 filed 11-14-73 entitled "Glass Conduit for Electrical Conductor" the disclosures of which are incorporated by reference, are disclosed underground power transmission networks employing tubular glass conduits for containing and electrically insulating the electrical power conductors. The present invention provides a semiconductive coating for the glass conduits of the type disclosed in these applications as well as other types of glass conduits for electrical power transmission.

The drawing is a cross sectional illustration of tubular glass conduit having a semiconductive coating thereon in accordance with the present invention.

Accordingly, the present invention provides a tubular glass conduit for loosely containing and electrically insulating an electrical power conductor capable of transmitting power in excess of 50 megawatts, wherein said conductor is supported by the internal surface of conduit and the residual free volume in said conduit not occupied by the conductor contains a heat transfer fluid, wherein the internal surface of the conduit is provided with a thin, tenaciously adhering, abrasion resistant, semiconductive coating of tin oxide or titanium oxide which coating has a surface resistivity in the range of about 10 to about 10,000 ohms per square and preferably about 300 to about 1,500 ohms per square.

There are peculiar and distinct advantages realized by use of tin oxide or titanium oxide semiconductive coating according to the present invention. The primary advantage, of course, is the protection against corona discharge. Corona discharge is an electrical discharge through air or other gaseous media under the influence of a potential gradient. When a high potential is impressed upon a conductor in a power transmission line, a potential gradient is established between the conductor and the insulating conduit, which is a glass conduit in the present situation. The air, $SF_6$, octofluorocyclobutane, or other heat transfer fluid contained in the free volume between the conductor and the glass conduit ionizes or breaks down causing loss of power and other disruptive effects. The present invention provides a semiconductive coating of tin oxide and titanium oxide on the internal surface of the tubular glass conduit so that the conductor and the semiconductive coating will be at substantially the same electrical potential. In that the coating is semiconductive rather than conductive, the actual current flow in the semiconductor will be very low so that electrical losses will also be quite low.

Another advantage of the tin oxide or titanium oxide semiconductive coating on the internal surface of the glass conduit is the protection afforded to electrically induced ion migration in the glass conduit. Such ion migration is a common cause of failure of materials in contact with metallic conductors at extreme potential gradients. The presence of the tin oxide or titanium oxide coating acts as a barrier to such electrically induced ion migration.

A third advantage in the use of tin oxide and titanium oxide as a semiconductive coating on the internal surface of the glass conduit is the abrasion resistance that such coatings provide. Such abrasion resistance is particularly advantageous in the present invention because of the manner in which the electrical conductor is installed within the tubular glass conduit. In one method of installation, contemplated by the invention, considerable solid length of stranded or segmented conductor is pulled into a given length of the glass conduit. Such a pulling technique can result in the severe abrasion of the internal surface of the glass conduit in the form of nicks and scratches. These nicks and scratches often serve as sites for electrical stress concentration which can result in dielectric breakdown.

The tin oxide and titanium oxide coatings are quite hard and resistant to abrasion and scratching and thus, reduce the probability of such mechanically induced flaws.

Referring now to the drawing, reference numeral 10 represents a tubular glass conduit having a semiconductive tin oxide coating 11 on the internal surface thereof. Disposed inside of tubular conduit 10 is a metallic conductor 12 which is shown as stranded elements in cross section for the purpose of illustration. Conductor 12 rests directly on semiconductive coating 11. The free volume 13 in tubular conduit 10 which is not occupied by conductor 12 is filled with gaseous $SF_6$ or air which are heat transfer fluids.

In operation, when power (e.g. 50 megawatts at 200 KV line to ground voltage) is being transmitted through conductor 12, the semiconductive coating 11 achieves substantially the same potential as conductor 12, and heat transfer fluid 13 is not subjected to a potential gradient sufficient to cause corona discharge. Furthermore, the tendency for electrically induced migration of the conductor into the glass conduit is materially reduced.

The conductors used to transmit the power of the semiconductive glass conduit of invention can be any conventional metallic conductors such as copper, aluminum, or molten sodium. When copper aluminum or other solid conductors are employed, they can be in various geometric forms such as stranded, bundled, segmented, and so on to achieve efficient conductivity.

While the semiconductive coated tubular glass conduit of invention can be used for any type of electrical transmission network, they are primarily significant in the undergrounds transmission of AC and DC power in excess of 50 megawatts. Those skilled in the art of electrical transmission will recognize this as the major area of importance in the transmission of electrical power from the point of generation to substations for distribution to the ultimate consumer. The major area of commercial importance are AC distribution networks in the 40 kilovolt (KV) to 600 kilovolt (KV) (line to ground) range.

The technique for pyrolyzing tin oxide and titanium oxide coatings on the glass surface are known in the art as represented by U.S. Pat. Nos. 2,566,346; Re 23,555; 2,118,795; 2,564,677; 2,564,706; 2,564,707; 2,564,987; 2,614,944; 2,698,261; 3,005,731; and 3,107,177 the disclosures of which are incorporated by reference.

According to the present invention, the internal surface of the tubular glass conduit is heated to a temperature above the pyrolysis temperature of the particular tin or titanium compound being employed. The range of temperatures used to pyrolyze the titanium or tin compounds varies between about 200°C and 700°C, depending upon the particular compound used and thermal stability of the glass conduit, with the usual range being from about 300°C to about 600°C.

The titanium or tin compounds which are employed for purposes of the present invention are ones which upon contact with the heated glass surface will react to form a semiconductive, abrasion resistant layer or coating of an oxide of the metal, on the glass surface. The oxide layer is tightly adherent to the surface of the glass. For convenience in reference, the oxide coating is referred to herein as "tin oxide" or "titanium oxide" although such oxide coatings are probably a complex mixture of oxides and silicates of various valence states.

Among the titanium-containing compounds suitable for purposes of the present invention are the alkyl titanates, preferably wherein the alkyl group contains from 1 to about 8 carbon atoms, and including tetrabutyl titanate, tetraisopropyl titanate, tetrakis (2-ethylhexyl) titanate and the like. Also included among the suitable titanium-containing compounds are the titanium tetrahalides, and particularly titanium tetrachloride.

The tin compounds that can be used for the purpose of the present invention include both stannous and stannic compounds. Among the suitable stannic compounds are the stannic halides, and the halkyl stannic carboxylates. The stannic halide can be exemplified by stannic chloride, stannic bromide, and stannic iodide.

The alkyl stannic carboxylates have the general formula $$(R_1)_x Sn(OOCR_s)_y$$

wherein $R_1$ and $R_2$ are alkyls, and wherein $x$ and $y$ are whole numbers from 1 to 3, the sum of which is equal to four. The alkyls can be branched or straight chain. $R_2$ preferably contains from 1 to 18 carbon atoms and can be a stearate, palmitate, laurate, or the like. $R_1$ preferably contains 1 to 8 carbon atoms and can be methyl, propyl, butyl, isopropyl, isobutyl, hexyl, octyl or the like. Included among the many compounds coming within the scope of the foregoing are dibutyl tin diacetate, dipropyl tin diacetate, dioctyl tin diacetate, dibutyl tin distearate, dibutyl tin dilaurate, dibutyl tin maleate and the like.

Among the stannous tin compounds suitable for the purposes of this invention are stannous dihalides, such as stannous chloride, stannous bromide, stannous iodide and the carboxylic acid salts of stannous tin. The latter include compounds having the formula $$Sn\left(-O-\overset{O}{\underset{\|}{C}}-R\right)_2$$

where R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. Among the carboxylic acid salts suitable for the purpose of this invention are stannous oleate, stannous palmitate, stannous stearate, stannous caproate, stannous laurate, stannous naphthenate, stannous tartrate, stannous gluconate, stannous acetate, and the like. It is to be understood that any titanium or tin compound can be used in forming the semiconductive coating on the glass, provided that such a compound is capable of pyrolyzing to the oxide on the glass surface, although stannic chloride and titanium tetrachloride are preferred because these compounds are readily available, are easily vaporized for application, and do not have a tendency to leave carbonaceous residues in the pyrolyzed coatings as do some of the organic tin or titanium compounds.

When pyrolyzing such tin and titanium compounds on the internal surface of the glass conduit, it may be desirable to provide water vapor to the inside of the conduit to assure efficient pyrolysis. Additives such as antimony in U.S. Pat. No. No. 2,546,707 can be applied with the tin or titanium compound to adjust the surface resistivity.

The most commercially expedient coating technique uses anhydrous tin tetrachloride vapor (SnCl$_4$). The vapor pressure of SnCl$_4$ at room temperature permits appreciable amounts to be transported in a moving gas flow. When dry gas such as air, oxygen, nitrogen, argon, and so on is bubbled through SnCl$_4$, the gas flow removes SnCl$_4$ as a vapor depending on the gas flow rate. The gas is then contacted with the heated glass conduit. The resulting semiconductive tin oxide coating have a surface resistivity of about 10 to 10,000 ohms per square and preferably about 300 to 1,500 ohms per square.

The present invention includes the application of a semiconductive tin oxide or titanium oxide coating by the methods disclosed above to the outside surface of the glass conduit to provide electrical shielding for the glass conduit when power is being transmitted therethrough.

In the following examples all parts are parts by weight, all percentages are weight percent, and all temperatures are in °C unless otherwise stated.

EXAMPLE 1

A section of cylindrical glass conduit (i.e., pipe) of several feet in length having an inside diameter of about 2 inches and an outside diameter of about 3 inches is fabricated from a borosilicate composition having the following properties:

| | |
|---|---|
| Working Point Temperature | 1240° C |
| Softening Point Temperature | 825° C |
| Annealing Point Temperature | 560° C |
| Strain Point Temperature | 520° C |
| Coefficient of Thermal Expansion | $32 \times 10^{-7}$ (0–300° C)/° C |
| Log of AC resistivity (ohm-cm) | 8.1 at 250° C |
| | 6.6 at 350° C |
| Dielectric constant (K) | 4.9 at 60 Hz and 25° C |
| Dissipation factor (tan $\delta$) | 0.0095 at 60 Hz and 25° C |

The glass conduit is placed in an electrically heated furnace and brought to a temperature of about 550°C to 600°C.

Tin chloride vapors and water vapor are then introduced into the heated conduit. The tin chloride vapors are generated by bubbling dry air through a reservoir of liquid stannic chloride at the rate of 3 SCFH and the water vapor is generated by bubbling air through a reservoir of liquid water at the rate of 5 SCFH. The two vapor streams separately flow through tubing and are mixed inside of the heated glass conduit.

The above conditions are maintained for about 15 seconds after which a thin, tenaciously adhering, substantially uniform, abrasion resistant, semiconductive tin oxide coating is present on the internal surface of the tubular glass conduit. The surface resistivity of the tin oxide coating is about 530 ohms per square. When the coated conduit is used in underground power transmission network for transmission power in excess of 50 megawatts as described in conjunction with the drawing, the heat transfer fluid is not subjected to the disruptive effects of corona discharge and the tendency for the conductor to electrically migrate into the conduit is reduced.

The tin oxide coated internal surface of the glass conduit is subjected to an abrasion resistance test by placing an aluminum rod (about one half the length of the conduit section and of slightly smaller diameter than the inside diameter of the conduit) inside the conduit and capping the conduit ends. The assembly is then mounted in a rotational apparatus so that as the conduit section is rotated, the aluminum rod slides back and forth. The apparatus is rotated until the aluminum rod has traveled the equivalent of 1,000 feet inside the glass conduit. The internal surface of the glass rod is observed to be only slightly abraded and the surface resistivity is about 520 ohms per square.

The aluminum rod is replaced and the abrasion test is continued and observed at time interval corresponding to the equivalent 2,000 feet, 3,000 feet, 4,000 feet, and 32,000 feet of travel. At these time periods, the surface resistivity is observed to be 520, 580, 580, and 690 ohms per square respectively. Some increased abrasion is noted at each of these observation points, although the abrasion is much less severe than that when the test is performed on a similar glass conduit that does not have a tin oxide coating thereon. Similar results are obtained when $TiCl_4$ is used in place of the $SnCl_4$ in the foregoing procedures.

EXAMPLE 2

Several tubular cylindrical glass conduits of various sizes are prepared from glass composition A and glass composition B having the composition and properties set forth below. Some of the conduits have ¼ inch inside diameter while other conduits have ¾ inch inside diameter. Some of the conduits have inside diameters intermediate these values and the wall thickness of the conduits ranges from about 20 mils to about 90 mils.

| Oxide | Composition A | Composition B |
|---|---|---|
| $SiO_2$ | 46.1 | 42.7 |
| $B_2O_3$ | 14.0 | 12.9 |
| $Al_2O_3$ | 16.4 | 16.2 |
| CaO | 13.5 | 13.1 |
| MgO | 10.1 | 9.5 |
| $ZrO_2$ | — | 5.7 |
| Electrical Properties at 150°C | | |
| Dielectric Constant (K) | 6.2 | 7.0 |
| Dissipation Factor (tan$\delta$) | 0.00074 | 0.0027 |
| K tan$\delta$ | 0.0046 | 0.0189 |
| Glass Properties | | |
| Working Point Temperature °C | 1030 | 1030 |
| Softening Point Temperature °C | 831 | 824 |
| Annealing Point Temperature °C | 671 | 679 |
| Strain Point Temperature °C | 647 | 656 |
| Coefficient of Thermal Expansion $\times 10^7$ (0–300°C)/°C | 52 | 52 |

Several sections of conduit composed of composition A and several sections of conduit composed of composition B are coated with a thin, tenaciously adhering abrasion resistant, semiconductive tin oxide coating on the inside surface thereof according to the procedures of Example 1. The surface resistivity of the coatings are in the range of about 500 ohms per square to about 1,000 ohms per square. When the coated conduits are used in an underground power transmission network for transmitting power in excess of 50 megawatts as described in conjunction with the drawing, the heat transfer fluid is not subjected to the disruptive effects of corona discharge and the tendency for the conductor to electrically migrate into the conduit is reduced.

The above tin oxide coated glass conduits are subjected to a dielectric breakdown test at various temperatures wherein a copper or aluminum electrode is inserted in the conduit and an annular copper or aluminum electrode of about 2 inches in length is placed outside of the conduit so that the glass conduit is confined between the two electrodes. The residual free volume inside the conduit is filled with air or $SF_6$ to simulate the presence of a heat transfer fluid. A direct current potential of 86 KV is then impressed across the electrodes with the negative electrode being inside of the conduit. Under these conditions, the electrical field across the glass conduit wall is in the range of about 1,000 to about 2,000 volts per mil of thickness.

Several combinations of conduit compositions, and sizes electrode materials, heat transfer fluids are tested at 86 KV as described above at 50°C increments of temperature beginning at 50°C through 350°C with and without a tin oxide coating.

The specimens are judged to have failed when the electric circuit is completed through the glass conduit. This is accompanied by fracture of the glass conduit wall. These temperature increments are selected to provide a service life expectation with the higher temperature representing more years of service. None of the specimens failed as of 5,000 hours of testing at temperatures below 350°C. At 350°C the advantages of the tin oxide coating become apparent in preventing dielectric breakdown by resisting migration of the conductor into the glass conduit. The data is presented below. Table I presents data for a dielectric breakdown test at 350°C for 250 hours and Table II presents data for a dielectric breakdown test at 350°C for 5,000 hours.

oxide coated conduit fails, the test life is more than double the longer of the two control specimens that did not have a tin oxide coating thereon. Furthermore, there is no visible copper residue on the glass surface which has been coated with tin oxide indicating that the failure is not due to migration of the conductor therein.

Having thus described the invention, what is claimed is:

1. In a tubular glass conduit loosely containing and electrically insulating an electrical power conductor capable of transmitting power in excess of 50 megawatts, wherein said conductor is supported by the internal surface of said conduit and the residual free volume in said conduit not occupied by the electrical conductor contains a heat transfer fluid, the improvement wherein said internal surface of said conduit is provided with a thin, tenaciously adhering, abrasion resistant, semiconductive coating from the group consisting Table I Dielectric Breakdown Testing at 350°C for 250 Hours

| Conduit Composition | Internal Electrode | Tin Oxide Coated | Heat Transfer Fluid | Outside Electrode | Time for Failure (hours) | Comment |
|---|---|---|---|---|---|---|
| A | Copper | yes | $SF_6$ | Aluminum | — | Specimen did not fail |
| A | Copper | no | air | Copper | — | Specimen did not fail |
| A | Aluminum | yes | $SF_6$ | Copper | — | Specimen did not fail |
| B | Aluminum | no | air | Aluminum | — | Specimen did not fail |
| B | Copper | no | air | Copper | 250 | Dark stains of a copper residue on internal glass surface |

Table II

Dielectric Life Testing at 350°C for 5000 Hours

| Conduit Composition | Internal Electrode | Tin Oxide Coated | Heat Transfer Fluid | Outside Electrode | Time for Failure (hours) | Comment |
|---|---|---|---|---|---|---|
| A | Aluminum | yes | $SF_6$ | Copper | — | Specimen did not fail |
| A | Aluminum | yes | air | Copper | — | Specimen did not fail |
| A | Aluminum | yes | air | Aluminum | — | Specimen did not fail |
| A | Copper | no | air | Copper | 629 | Severe dark copper residue bonded to internal glass surface |
| A | Copper | no | $SF_6$ | Aluminum | 874 | Severe, dark copper residue bonded to internal glass surface |
| A | Copper | yes | $SF_6$ | Aluminum | 1965 | No copper residue visible on glass surface |

The foregoing data indicates that the presence of the tin oxide coating on the internal surface of the glass conduit reduces the tendency for conductor migration into the glass conduit and thereby maintains the dielectric breakdown strength of the glass conduit for prolonged service life. In the one instance where the tin of tin oxide or titanium oxide, said coating having a surface resistivity in the range of about 300 to about 1,500 ohms per square.

2. The improvement of claim 1 wherein said semiconductive coating is tin oxide.

* * * * *